(12) United States Patent
Quiroz

(10) Patent No.: US 9,969,209 B2
(45) Date of Patent: May 15, 2018

(54) MOLDED WHEEL DEVICE

(71) Applicant: Joshua Quiroz, Vallejo, CA (US)

(72) Inventor: Joshua Quiroz, Vallejo, CA (US)

(73) Assignee: Joshua Quiroz, Vallejo, CA (US)

(*) Notice: Subject to any disclaimer, the term of this patent is extended or adjusted under 35 U.S.C. 154(b) by 383 days.

(21) Appl. No.: 14/721,997

(22) Filed: May 26, 2015

(65) Prior Publication Data
US 2016/0347119 A1    Dec. 1, 2016

(51) Int. Cl.
*B60B 5/02* (2006.01)

(52) U.S. Cl.
CPC ............ *B60B 5/02* (2013.01); *B60B 2310/20* (2013.01); *B60B 2310/204* (2013.01); *B60B 2310/318* (2013.01); *B60B 2310/321* (2013.01); *B60B 2310/52* (2013.01); *B60B 2310/80* (2013.01); *B60B 2360/3416* (2013.01)

(58) Field of Classification Search
CPC ........................................................ B60B 5/02
See application file for complete search history.

(56) References Cited

U.S. PATENT DOCUMENTS

| 4,294,490 A * | 10/1981 | Woelfel | B29C 53/60 |
| | | | 301/64.703 |
| 2010/0141022 A1* | 6/2010 | Hendel | B60B 5/02 |
| | | | 301/64.703 |
| 2012/0043014 A1 | 2/2012 | Lim et al. | |
| 2014/0346847 A1* | 11/2014 | Werner | B29C 70/34 |
| | | | 301/64.703 |

FOREIGN PATENT DOCUMENTS

WO    WO-2013/083500 A1 *  6/2013

* cited by examiner

*Primary Examiner* — Jeffry A Aftergut

(57) ABSTRACT

A method of manufacturing a wheel device including bonding a hub portion with lug holes and center bore hole, a spokes portion, and a barrel portion to generally form a mandrel or an inner frame of the wheel device. The inner frame is a scaled down size of the wheel device, in which a composite skin is wrapped around the inner frame to form an uncured wheel device. The uncured wheel device is encased inside a mold apparatus to cure. A cured wheel device of this method provides a wheel device with barrel, spokes, hub, lug holes and center bore hole molded into said wheel device without the use of a machine to carve out the spokes, hub, log holes or center bore hole.

20 Claims, 4 Drawing Sheets

MOLDED WHEEL DEVICE

CROSS-REFERENCE TO RELATED APPLICATIONS

Not Applicable.

RELATED CO-PENDING U.S. PATENT APPLICATIONS

Not Applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not Applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to motor vehicle parts. More particularly, the invention relates to a method for manufacturing a carbon fiber composite wheel.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that it may be beneficial to manufacture motor vehicle parts from carbon fiber to reduce the overall weight of the vehicle.

By way of educational background, another aspect of the prior art generally useful to be aware of is that some prior art methods for producing a carbon fiber wheel may involve placing carbon fiber fabric into a mold cavity. Such approaches may not handle making intricate features since smaller details may be difficult to mold.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a top perspective partially cutaway view, and FIG. 1B is a cross sectional side view;

FIG. 4A is a cross sectional side view, and FIG. 4B is an exploded side view.

Figure 1A:
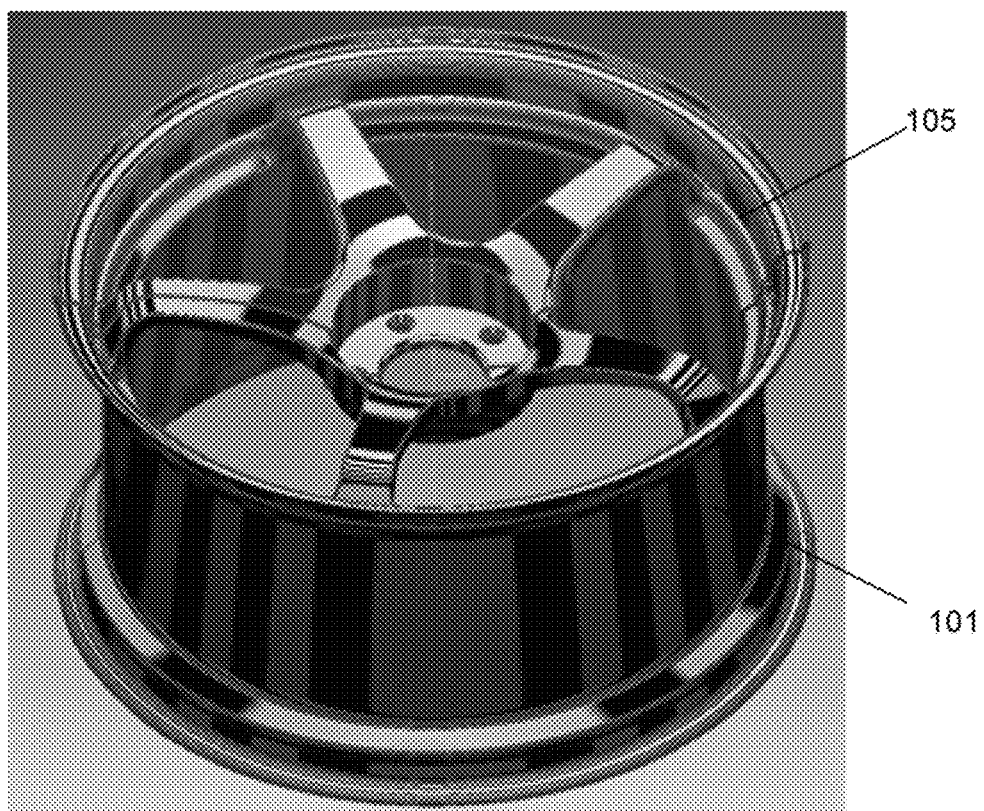
FIG. 1A and FIG. 1B illustrate an exemplary carbon fiber composite wheel, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of the term "substantially" as connoting a term of approximation or a term of magnitude"). Here, when referring to the "substantially halfway" limitation, the Specification uses the word "approximately" as a substitute for the word "substantially" (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of" and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide a method for manufacturing a carbon fiber composite wheel frame using a mandrel. The mandrel may be formed as a multi-functional frame on which carbon fiber sheets may be laid in a multiplicity of suitable shapes, including, without limitation, complex shapes. In some embodiments the frame may also serve as an integrated structural component of a specified wheel piece.

Figure 1B:
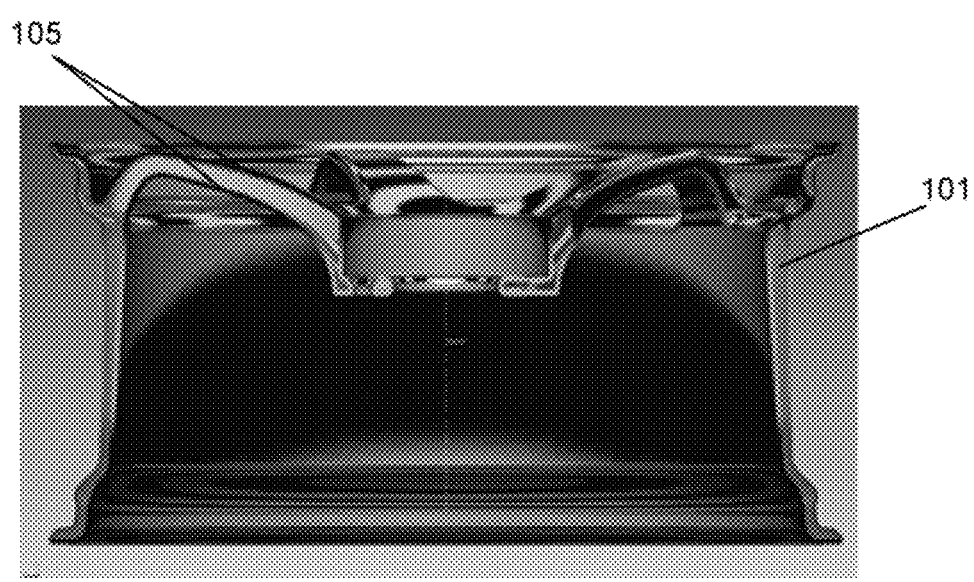

FIG. 1A and FIG. 1B illustrate an exemplary carbon fiber composite wheel, in accordance with an embodiment of the present invention. FIG. 1A is a top perspective partially cutaway view, and FIG. 1B is a cross sectional side view. In the present embodiment, the wheel may comprise an inner frame 101 in the near net shape of the wheel encased in a carbon fiber skin 105. Herein, near net shape may be used to describe an item that is very close in shape to the final product yet may require additional finishing, and net shape may be used to refer to an object in its finished form. Referring to FIG. 1A, a portion of carbon fiber skin 105 is cut away to illustrate both carbon fiber skin 105 and inner frame 101. In the present embodiment, inner frame 101 may be multi-functional. For example, without limitation, frame 101 may act as a scaffold on which carbon fiber skin 105 may be molded and while providing some structural support to the wheel. In the present embodiment, the primary load bearing structure of the wheel is typically carbon fiber skin 105 with frame 101 serving as a secondary load distribution structure. It is contemplated that some alternate embodiments may be implemented in which the inner frame is the primary load bearing structure or in which the inner frame and the carbon skin equally bear the load. Yet other embodiments may be implemented in which the inner frame bears none or very little of the load.

Figure 2:
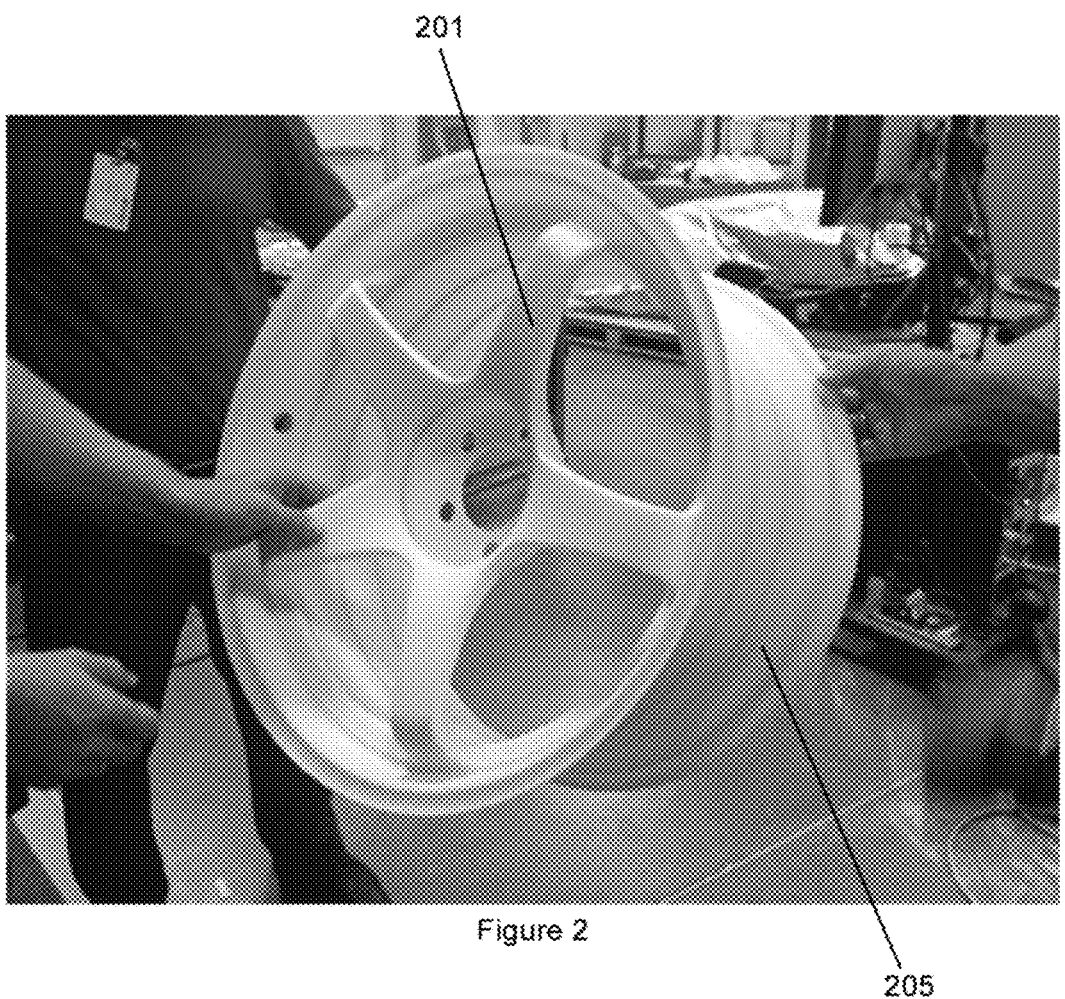
FIG. 2 is a front perspective view of an exemplary inner frame, in accordance with an embodiment of the present invention.

FIG. 2 is a front perspective view of an exemplary inner frame, in accordance with an embodiment of the present invention. In the present embodiment, the inner frame may be used as a bi functional mandrel, serving as both a permanent inner structure within the net shape of the wheel and as a secondary structural member of the completed wheel. Typically, the inner frame may be formed as a scaled down version of the final wheel to account for the thickness of the carbon fiber skin. In the present embodiment, the inner frame may be made of a foam material such as, but not limited to, Rohacell RIST 71 HT foam, Balsa, Honeycomb, PVC Foam, PET foam, carbon foam, plastic, fiber glass, chopped carbon fiber, etc. By using a material for the inner frame that is commonly less dense than the carbon fiber skin in which the inner frame may be wrapped, it is contemplated that the finished wheel may be extremely light weight yet incredibly strong. The strength to weight ratio may be increased be achieved with this method as the inner frame may act like a composite sandwich structure, separating the primary load bearing structures of the carbon fiber skin typically increases the stiffness of the overall structure, thereby distributing load more efficiently across the structure, which may be a beneficial method for creating light yet strong composite components. For example, without limitation, the weight benefit that may be gained using a foam inner core according to the present embodiment may be roughly 40-70% weight reduction verses a forged aluminum wheel at 21 lbs. Those skilled in the art will readily recognize, in light of and in accordance with the teachings of the present invention, that a multiplicity of suitable materials may be used to form the inner frame in some alternate embodiments including, without limitation, various different plastics, aluminum, titanium, other metals, fiberglass, other composite materials, wood, etc.

In the present embodiment, the inner fame may be produced in three to five pieces, for example, without limitation, a wheel hub with bolt or lug holes and a center bore hole and spokes as a single piece and two barrel halves, or a hub, one or more spoke pieces, and two barrel halves. A wheel hub/spoke piece 201 may be machined on a 5 axis machine. The barrel halves may be thermoformed into c shaped pieces, machined into their net shapes, and then bonded together to form a wheel barrel 205. Wheel hub/spoke piece 201 may be subsequently bonded to barrel 205 to form a mandrel or foam wheel in the near net shape of the desired finished wheel. It is contemplated that inner frames in some alternate embodiments may be formed in different ways using different methods. For example, without limitation, all of the pieces may be thermoformed. In some instances, the pieces may be formed using alternate methods, such as, but not limited to, machining, molding, vacuum forming, 3-D printing, thermoforming, compression molding, injection molding, etc. In some other instances, all features including, without limitation, bolt or lug holes, center bore holes, spokes, hubs, and barrels may be molded into the frame as opposed to machining the features into the wheel. In some embodiments, the frame may be formed as a single piece. In some other embodiments, without limitations, the frame may be used as a permanent mandrel to increase productivity of a wheel manufacturing process.

Figure 3:
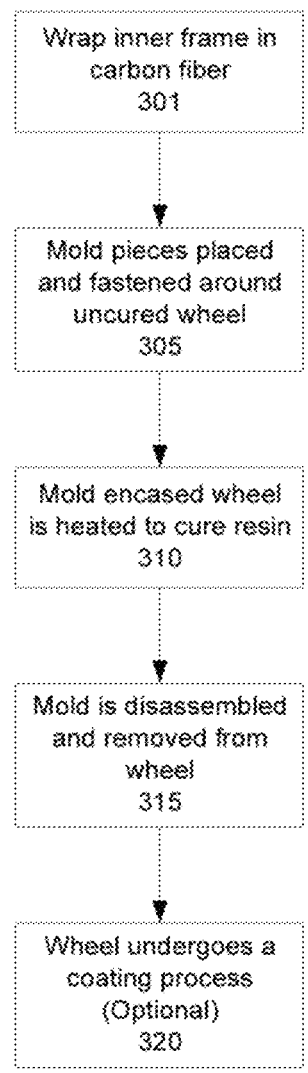
FIG. 3 is a flowchart illustrating an exemplary method for manufacturing a carbon fiber composite wheel, in accordance with an embodiment of the present invention.

FIG. 3 is a flowchart illustrating an exemplary method for manufacturing a carbon fiber composite wheel, in accordance with an embodiment of the present invention. In the present embodiment, this method typically involves wrapping an inner frame in carbon fiber and placing the wrapped frame in a mold for processing to form a finished carbon fiber wheel. In step 301, once the inner frame is formed to the appropriate specifications for the finished wheel, the frame is completely wrapped in carbon fiber sheets. Wrapping the inner frame typically enables a user to create a three dimensional object, a wheel, from two dimensional materials, carbon fiber sheets, while also producing design details that may not be possible when placing carbon fiber sheets into an open cavity mold. This may include without limitation many design features found on intricately designed aluminum wheels such as, but not limited to, intricate wheel face profiles, spoke designs, spoke to barrel interface, bolt holes, valve stems, hub design, barrel design, etc. All features including, without limitation, bolt or lug holes, center wheel bore holes, spokes, hubs, and barrels may be molded into the wheel as opposed to machining the features into the wheel after the curing of the carbon fiber fabric. The mold is assembled around the wheel and the final wheel tolerances will be taken from the mold. When wrapping the carbon fiber sheets around the frame, the carbon fiber is typically placed along the load paths of the bolt holes. The carbon fiber fabric is cut in various shapes to efficiently wrap around the inner frame. The carbon fiber fabric can be cut by hand with sheers or a razor blade or the fabric can be cut with an automated cutting machine. The thickness of the carbon fiber skin may be dependent on wheel design specifications. For example, without limitation, in one implementation, the hub, spokes, and inner barrel may be designed to have a 3 mm thick skin front and back, which would be ten layers of a carbon fiber fabric that is 0.3 mm thick per sheet while the outer barrel may be designed to have a 1.5 mm thick skin, which would be five layers of carbon fiber fabric that is 0.3 mm thick per sheet. In another implementation, without limitation, the permanent mandrel is used as a secondary load bearing structure, the primary structure being the carbon fiber skin. Those skilled in the art will readily recognize, in light of and in accordance with the teachings of the present invention, that some embodiments may be incorporated to create wheels of various different shapes, sizes and thicknesses.

The carbon fiber fabric will be wrapped over the frame in a manner to account for loads in all directions. Ideally the carbon fiber fabric will be laid up so the fabric is aligned with the load paths of the wheels, this will ensure the fabric's tremendous tensile strength properties are utilized. The preferred lay up schedule is as follows:

In the present embodiment, the carbon fiber fabric that may be used to form the skin around the inner frame may be Hexcel 5HS 6k carbon fiber fabric that may be a dry

TABLE 1-1

| Ply # | Ply thickness (mm) | Hub face | Hub back | Spoke face | Spoke side | Spoke back | Barrel outer | Barrel inner | Stud hole | Center hole | Valve stem hole |
|---|---|---|---|---|---|---|---|---|---|---|---|
| 1 | 0.3 | +/−45 | +/−45 | +/−45 | +/−45 | +/−45 | 0/90 | +/−45 | +/−45 | +/−45 | +/−45 |
| 2 | 0.6 | 0/90 | 0/90 | 0/90 | 0/90 | 0/90 | +/−45 | 0/90 | 0/90 | 0/90 | 0/90 |
| 3 | 0.9 | +/−45 | +/−45 | +/−45 | +/−45 | +/−45 | 0/90 | +/−45 | +/−45 | +/−45 | +/−45 |
| 4 | 1.2 | 0/90 | 0/90 | 0/90 | 0/90 | 0/90 | +/−45 | 0/90 | 0/90 | 0/90 | 0/90 |
| 5 | 1.5 | +/−45 | +/−45 | +/−45 | +/−45 | +/−45 | 0/90 | +/−45 | +/−45 | +/−45 | +/−45 |
| 6 | 1.8 | 0/90 | 0/90 | 0/90 | 0/90 | 0/90 | | 0/90 | 0/90 | 0/90 | 0/90 |
| 7 | 2.1 | +/−45 | +/−45 | +/−45 | +/−45 | +/−45 | | +/−45 | +/−45 | +/−45 | +/−45 |
| 8 | 2.4 | 0/90 | 0/90 | 0/90 | 0/90 | 0/90 | | 0/90 | 0/90 | 0/90 | 0/90 |
| 9 | 2.7 | +/−45 | +/−45 | +/−45 | +/−45 | +/−45 | | +/−45 | +/−45 | +/−45 | +/−45 |
| 10 | 3 | 0/90 | 0/90 | 0/90 | 0/90 | 0/90 | | 0/90 | 0/90 | 0/90 | 0/90 | fabric or "pre-impregnated" with a matrix material, such as, but not limited to, an epoxy resin. The matrix may be partially cured or uncured at this stage to typically enable a user to manipulate the carbon fiber fabric. Once the matrix is cured, usually in an oven or autoclave, the carbon fiber fabric will typically be a hardened solid structure. It is contemplated that various different types of carbon fiber fabric such as woven carbon fiber fabrics, spread tow carbon fiber fabrics, multi-axial fabrics, unidirectional sheets, chopped carbon fiber sheet molding, and filament wound fibers may be used to wrap the inner frame including, but not limited to, material that is not pre-impregnated with matrix. In some alternate embodiments, carbon fiber filament may be wrapped around the inner frame rather than carbon fiber fabric.

Figure 4A:
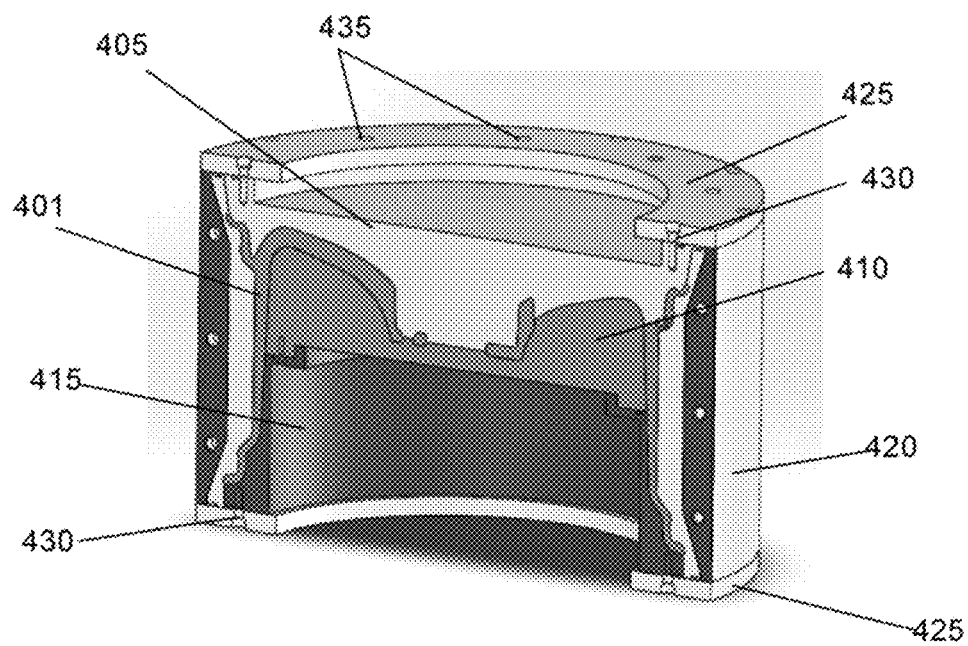
FIG. 4A and FIG. 4B illustrate an exemplary carbon fiber composite wheel in a curing mold, in accordance with an embodiment of the present invention.
Figure 4B:
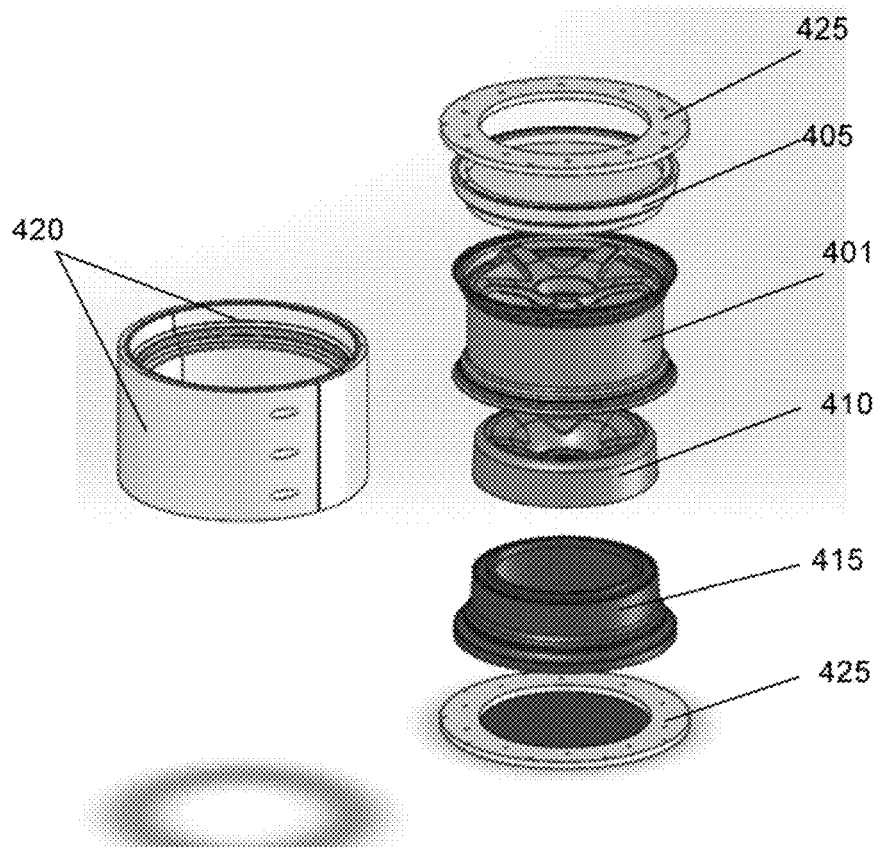

In the present embodiment, after the inner frame is completely wrapped in carbon fiber, mold pieces may be placed around the uncured wheel and fastened together in step 305. A non-limiting exemplary mold is illustrated in FIG. 4A and FIG. 4B. The mold pieced may be made of Aluminum 6065 or other suitable heat resistant materials such as, but not limited to, steel, other metals, ceramics, composite materials, carbon foams, etc. In some embodiments, in which heat curing is not necessary, the mold pieces may be made of non-heat resistant materials such as, but not limited to, various plastics, rim board or other dense foam materials, fiberglass, etc. Then, in step 310, the secured mold and encased wheel may be heated to cure the epoxy resin in the impregnated carbon fiber fabric. In the present embodiment, Epon 862 epoxy resin with Curing Agent W may be infused or preimpregnated into the carbon fiber fabric, which typically cures at a range from 300-400 degrees F. It is contemplated that various different matrixes may be impregnated into the carbon fiber fabric in some alternate embodiments such as, but not limited to, different types of epoxy resins, polymers, poly urethane, natural resins, BMI resins, poly ester resins, etc. Some of these matrix materials may cure at various different temperature ranges and environments. Some of these matrix materials may be able to cure without being heated. Thus, if such a material is used, step 310 may be skipped. In some embodiments additives may be placed in the matrix to give the finished product various different properties. For example, without limitation, Zyvex ZySER activated multi wall carbon nanotubes, carbon fibers, glass fibers, or silica may be added as a toughening agent. Some alternate embodiments may be implemented using carbon fiber material that is not pre impregnated. In these embodiments, the matrix material may be brushed or poured over the wheel before placing the mold, or the mold may be infused with the matrix material after the mold has been applied on the wheel.

When using pre impregnated carbon fiber fabric, it is typically desirable to place pressure on the carbon fiber fabric during the curing process to aid in reducing air voids, which may increase the structural integrity of the part. A part comprising pre impregnated carbon fiber fabric is typically cured in an autoclave since an autoclave can apply both pressure and heat to the part by using disposable materials such as, but not limited to, vacuum bags, breather films, peel ply, etc. Due to the amount of energy that may be used to heat an autoclave and apply pressure to the part, one may expect that operating an autoclave may be expensive. In the present embodiment, the foam structure of the inner frame may typically expand during a heated curing process. The expansion of the inner frame due to the heat may act as an internal pressure vessel, which can aid in compacting the carbon fibers and minimizing air voids. Therefore, some embodiments may be cured using an oven alone or by applying heated elements to the outside of the mold rather than autoclave processing. Additionally, since the mold in the present embodiment is a closed cavity mold which is reusable, waste from the process may be reduced. In some cases an autoclave may still be used for the curing process. Moreover, some embodiments may employ various different types of curing processes including, but not limited to, air curing, vacuum bagging, etc.

After the wheel has been cured for the necessary amount of time, the mold may be disassembled and removed from the wheel in step 315. Typically, the wheel leaves the mold in the desired net shape to exact tolerances with a class A finish on all sides. In step 320, the wheel may optionally go through a coating process to coat the wheel with a UV protectant clear coat, paint or both. Some embodiments may have an uncoated surface in the finished state. Some embodiments may be coated and decorated with a multiplicity of suitable items such as, but not limited to, decals, stickers, badges, glossy, matte or semi-gloss finishes, water repellants, etc.

FIG. 4A and FIG. 4B illustrate an exemplary carbon fiber composite wheel 401 in a curing mold, in accordance with an embodiment of the present invention. FIG. 4A is a cross sectional side view, and FIG. 4B is an exploded side view. In the present embodiment, the mold comprises seven individual mold components that may be bolted together to completely encase un-cured wheel 401. These components may include, without limitation, a wheel face component 405 that molds to the front sides of the spokes, the front and sides of the hub and the front lip; a back side wheel component 410 that molds to the back sides of the spokes and hub and a portion of the inner barrel face, a back inner barrel component 415 that molds to a portion of the inner barrel and the back lip; two outer barrel halves 420; and two clamping rings 425. Referring to FIG. 4A, the mold is assembled around the inner frame wrapped in carbon fiber fabric and held in place with fastening means 430 such as, but not limited to, bolts, screws or nails inserted into bolt holes 435. It is contemplated that the molds in some embodiments may be made with fewer or more mold components. The number of mold components used may depend at least partly on how intricate the wheel design is. For example, without limitation, a simple wheel may be cured in a mold that comprises a front side component, a back side component, and two outer barrel halves while a more complex design may be cured in a mold with more components so that intricate details may be properly molded. Furthermore, in some embodiments the mold components may be held together by means other than screws or bolts such as, but not limited to, clamps, straps, vices, vacuum bags, etc. In the present embodiment, the final wheel tolerances may be taken from the mold. Aluminum 6065 may be used to produce the mold components, which may produce a class A finish on all sides of the cured wheel with minimal to no post processing. Some embodiments may comprise mold components made of various different materials such as, but not limited to, different metals, ceramic, fiberglass, etc.

Placement of carbon fiber sheets into a mold cavity as described by the prior art may entail placing fiber sheets into tight spaces and crevices inside the mold. This can cause the process to be slow and prone to mistakes. In addition, intricate features of a wheel and smaller details may be difficult or impossible to mold. An aspect of the present embodiment is to provide a free standing inner core around which carbon fiber may be wrapped. In many applications this may be a faster and more efficient process than the use of an open mold cavity. Furthermore, when layering up carbon fiber into an open mold cavity, a user is typically attempting to make a three dimensional shape from two dimensional materials. To do this carbon fiber sheets are typically built up by stacking thick sheets together to create the three dimensional shape. This may also add significant weight to the finished product. The prior art also describes machining wheel bolt holes into the cured carbon fiber wheel hub. Drilling into the carbon fiber normally breaks some of the carbon fibers, which may reduce the strength of the material. To compensate for the reduced strength of the drilled carbon fiber, the prior art describes adding an aluminum hub to the carbon fiber wheel, which adds weight to the wheel. An aspect of the present embodiment is to mold bolt holes and other features into the wheel so that these features do not need to be machined into the wheel after curing. Therefore, it is contemplated that no reinforcing aluminum plates may be necessary in many applications, which may enable the entire wheel to be constructed of lightweight materials such as, but not limited to, carbon fiber and foam while still remaining suitably strong.

Some embodiments of the present invention may be used by OEM automotive companies for passenger vehicles, OEM wheel companies for passenger vehicles, aftermarket wheel companies for passenger vehicles, racing wheel companies for racing cars, industrial automotive manufacturers, aircraft manufacturers, etc. Furthermore, it is contemplated that some manufacturers may make and sell the inner frame separately, without a carbon fiber skin. Those skilled in the art will readily recognize, in light of and in accordance with the teachings of the present invention, that similar techniques to those described in the foregoing may be used in some alternate embodiments to produce automobile parts other than wheels including, without limitation, body panels, fins, spoilers, interior features, etc. In addition a multiplicity of suitable items other than automobile parts such as, but not limited to, bicycle wheels and frames, surfboards, kayaks, paddleboards, paddles, various types of watercrafts, helmets, aircraft parts, building materials, musical instruments, etc.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a method for manufacturing a carbon fiber composite wheel according to the present invention will be apparent to those skilled in the art. Various aspects of the invention have been described above by way of illustration, and the specific embodiments disclosed are not intended to limit the invention to the particular forms disclosed. The particular implementation of the method for manufacturing a carbon fiber composite wheel may vary depending upon the particular context or application. By way of example, and not limitation, the methods described in the foregoing were principally directed to carbon fiber reinforced implementations; however, similar techniques may instead be applied to implementations that incorporate various different types of reinforcing materials such as, but not limited to, carbon nanotubes, glass fibers, metal fibers, high strength polymers, future materials that have yet to be developed, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
   forming, a wheel hub portion with a plurality of bolt or lug holes, a center bore hole, and a spoke portion as a single piece, in which said forming step comprising at least one of machining, thermoforming and molding;
   forming a wheel barrel portion by bonding two barrel halves together, wherein each barrel half is a c-shaped thermoformed barrel half;
   bonding said wheel hub portion with said wheel barrel portion to generally form at least a mandrel arrangement in an approximate shape of a wheel device, in which said mandrel arrangement comprising a proximate scaled down size of said wheel device;
   cutting a carbon fiber sheet in various shapes for wrapping around said mandrel arrangement;
   wrapping said mandrel arrangement with at least said cut carbon fiber sheet, wherein said cut carbon fiber sheet is typically placed along the load paths of said plurality bolt or lug holes, and wherein said mandrel arrangement wrapped in said cut carbon fiber sheet is configured to substantially form an uncured wheel device;
   assembling a mold apparatus for said uncured wheel device, wherein said mold apparatus comprises individual mold components, in which said assembling step comprising the steps of:
      coupling a wheel face component that molds to a proximate front surface of said mandrel arrangement wrapped with said carbon fiber sheet;
      coupling a back side wheel component that molds to a proximate back side segment of said mandrel arrangement wrapped with said carbon fiber sheet including a back side segment of said spoke portion, a proximate back side segment of said wheel hub portion, and a segment of a proximate inner surface area of said wheel barrel portion wrapped with said carbon fiber sheet;
      coupling a back inner barrel component that molds to said proximate inner surface part of said wheel barrel portion and a back lip section of said wheel barrel portion, wrapped with said carbon fiber sheet; and
      encasing said individual molding components and said uncured wheel device with two outer barrel halves and two clamping rings bolted together; and
   curing said uncured wheel device in said mold apparatus, in which said curing step further comprising the steps of heating said uncured wheel device encased inside said mold apparatus in at least an autoclave, thereby, providing a wheel device without having to carve out said plurality of bolt or lug holes or said center bore hole.

2. A method comprising:
   steps for separately forming a wheel hub portion with bolt or lug holes, a center bore hole, and a spoke portion;
   steps for forming a wheel barrel portion;
   steps for bonding said wheel hub portion and wheel barrel portion to form an inner frame in a proximate near net shape of a wheel device, in which said inner frame comprises a generally scaled down size of a wheel device;
   steps for cutting a carbon fiber sheet in various shapes for wrapping around said inner frame;
   steps for wrapping said inner frame with at least said cut carbon fiber sheet to substantially form at least an uncured wheel device;
   steps for assembling a mold apparatus for said uncured wheel device, wherein said mold apparatus comprising individual mold components, in which said assembling step comprises:
      steps for coupling a wheel face component that molds to a proximate front surface of said spoke portion, a proximate front surface of said wheel hub portion, and a front lip section of said wheel barrel portion, wrapped with said carbon fiber sheet;
      steps for coupling a back side wheel component that molds to a proximate back side segment of said spoke portion, a proximate back side segment of said wheel hub portion, and a segment of a proximate inner surface of said wheel barrel portion, wrapped with said carbon fiber sheet;
      steps for coupling a back inner barrel component that molds to a proximate inner surface portion of said wheel barrel and a back lip section of said wheel barrel portion, wrapped with said carbon fiber sheet; and
      encasing said individual molding components and uncured wheel device with two outer barrel halves and two clamping rings;

step for curing said uncured wheel device encased in said mold apparatus, wherein said bolt or lug holes and said center bore hole are substantially molded into said wheel device, thereby, said bolt or lug holes or center bore hole are not machined out of said wheel device.

3. The method of claim 2, in which said mold apparatus comprising individual mold components substantially bolted together to completely encase said uncured wheel device.

4. The method of claim 3, in which said wheel face component being configured to mold to proximate front sides of said spokes portion and proximate front and sides of said hub portion, and in which said mold component further comprising at least a back side wheel component being configured to mold to proximate back sides of said spokes portion and hub portion and a proximate face of said barrel portion, and in which said mold components further comprising a back inner barrel component being configured to mold to a portion of said barrel portion and a proximate back lip of said barrel portion, and in which said mold component further comprising two outer barrel halves and two clamping rings.

5. The method of claim 4, further comprising a step for disassembling said mold apparatus.

6. The method of claim 5, further comprising a step for removing said mold apparatus.

7. The method of claim 2, in which said forming a wheel hub portion further comprising the step of machining said wheel hub portion and spoke portion on a 5 axis machine.

8. The method of claim 2, in which said bonding step comprises at least one of vacuum forming, 3-D printing, thermoforming, compression molding and injection molding.

9. The method of claim 2, in which said inner frame comprising at least one of a foam, a Balsa, a Honeycomb, a PVC Foam, a PET foam, and a carbon foam being configured to produce a light weight and strong wheel device.

10. The method of claim 2, in which said wrapping step of said inner frame further comprising the step of aligning said carbon fiber sheets approximately along a load path of said wheel device.

11. The method of claim 10, wherein said wrapping step is configured to enable a three dimensional wheel device to be formed from two dimensional carbon fiber sheets.

12. The method of claim 2, further comprising a step for cutting said carbon fiber sheet in various shapes being configured to wraparound said inner frame.

13. The method of claim 2, in which said carbon fiber sheet comprising a carbon fiber fabric, wherein said fabric comprising at least one of a dry fabric and pre-impregnated fabric with a matrix material, and wherein said matrix comprising at least an epoxy resin.

14. The method of claim 3, in which said mold apparatus comprising at least one of an Aluminum 6065, a heat resistant metal, and a ceramic.

15. The method of claim 2, in which said carbon fiber sheet comprising at least one of a woven carbon fiber fabric, a spread tow carbon fiber fabric, a multi-axial fabric, a unidirectional sheet, a chopped carbon fiber sheet molding, and a filament wound fiber, being configured to wrap said inner frame.

16. The method of claim 15, in which said wrapping step further comprising a step for infusing at least an epoxy resin with a Curing Agent into said carbon fiber sheet.

17. The method of claim 16, in which said curing step further comprising a step for heating said uncured wheel device encased inside said mold apparatus in at least an autoclave to a temperature range of approximately 300 to 400 degrees F.

18. The method of claim 17, in which said curing step further comprising a step for applying pressure on said uncured wheel device being configured to substantially reduce air voids in said uncured wheel device.

19. The method of claim 6, further comprising a step for coating said cured wheel device with at least one of a UV protectant clear coat and paint.

20. A device comprising consisting essentially of:
means for separately forming at least a wheel hub portion with lug holes, center bore hole, and a spokes portion;
means for forming a wheel barrel portion from a pair of C-shaped barrel halve;
means for bonding said wheel hub portion and said wheel barrel portion to form an inner frame in an approximately net shape of a wheel device, in which said inner frame comprising a generally scaled down size of said wheel device;
means for wrapping said inner frame to substantially form at least an uncured wheel device;
means for cutting said wrapping means in various shapes configured to wrap around said inner frame;
means for molding said uncured wheel device, wherein said molding means comprises individual mold components, said molding means comprising:
means for molding to a proximate front surface of said inner frame wrapped with said cut carbon fiber sheet;
means for molding to a proximate back side segment of said inner frame;
means for molding to a proximate inner surface part and a back lip section of said inner frame, wrapped with said carbon fiber sheet;
means for encasing said molding means and said uncured wheel device;
means for curing said uncured wheel device positioned inside said molding means, wherein said lug holes and center bore hole are substantially molded into said wheel device.

* * * * *